(12) United States Patent
Fujita et al.

(10) Patent No.: US 6,439,652 B2
(45) Date of Patent: Aug. 27, 2002

(54) INSTRUMENT PANEL MOUNTING STRUCTURE

(75) Inventors: Yukihisa Fujita, Saitama (JP); Takashi Takeuchi, Kanagawa (JP)

(73) Assignees: Calsonic Kansei Corporation, Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/897,756

(22) Filed: Jul. 3, 2001

(30) Foreign Application Priority Data

Jul. 3, 2000 (JP) ........................................ 2000-200440

(51) Int. Cl.⁷ ................................................ B60J 7/00
(52) U.S. Cl. ........................................ 296/192; 296/72
(58) Field of Search ........................... 296/70, 72, 192; 180/90

(56) References Cited

U.S. PATENT DOCUMENTS

| | | | |
|---|---|---|---|
| 2,818,933 A | * | 1/1958 | Tell |
| 4,105,223 A | * | 8/1978 | Oda et al. |
| 4,559,868 A | * | 12/1985 | Nonaka et al. |
| 4,646,879 A | * | 3/1987 | Mahler et al. |
| 5,549,344 A | * | 8/1996 | Nishijima et al. |

FOREIGN PATENT DOCUMENTS

| | | | |
|---|---|---|---|
| DE | 3310886 A1 | * | 9/1984 |
| DE | 19611192 A1 | * | 9/1997 |
| DE | 19807309 A1 | * | 9/1999 |
| JP | 11-254999 | | 9/1999 |

* cited by examiner

Primary Examiner—Joseph D. Pape
Assistant Examiner—Scott A. Carpenter
(74) Attorney, Agent, or Firm—Foley & Lardner

(57) ABSTRACT

For mounting an instrument panel onto a given portion in a motor vehicle, there is provided an instrument panel mounting structure. A cowl panel is arranged at the given portion. The cowl panel includes an upper panel part and a lower panel part which are united to constitute an inwardly protruding holder structure. The holder structure comprises a first section where the upper and lower panel parts intimately contact at mutually facing surfaces thereof and a second section where the upper and lower panel parts are spaced from each other at the mutually facing surfaces thereof. The second section constitutes a rear end of the holder structure. Catch devices are provided by the instrument panel. Each catch device includes a catch section and a guide section. The catch section is constructed to catch the rear end of the holder structure when brought to the rear end of the holder structure. The guide section is constructed to guide the catch section toward the rear end of the holder structure when shifted toward the holder structure.

12 Claims, 6 Drawing Sheets

INSTRUMENT PANEL MOUNTING STRUCTURE

BACKGROUND OF THE INVENTION

1. Field of the Invention

The present invention relates in general to structures for mounting an instrument panel onto a given portion in a motor vehicles, and more particularly to the structures of a type that facilitates the work for mounting the instrument panel to the given portion and provides the given portion with a satisfied supporting stability for the instrument panel.

2. Description of Related Art

In order to clarify the task of the present invention, one known instrument panel mounting structure will be described with reference to FIG. 8 of the accompanying drawings, which is Shown in Japanese Patent First Provisional Publication 11-254999.

In FIG. 8, denoted by numeral 1 is a cowl panel that is arranged below a windshield 2. Although not shown in the drawing, the windshield 2 has a lower edge held by a front portion of the cowl panel 1. The cowl panel 1 generally comprises an upper panel part 3 and a lower panel part 4 which are secured at a lower end portion of the upper panel part 3. The upper panel part 3 is formed with a plurality of mounting openings 5. Each mounting opening 5 has a tubular catch member 7 fitted thereinto. Each tubular catch member 7 has a skirt-like enlarged mouth 7a. Denoted by numeral 6 is an instrument panel which has a plurality of pins 6a extending therefrom. For assembling the instrument panel 6 onto the cowl panel 1, the instrument panel 6 is conveyed forward, that is, toward the cowl panel 1 having the pins 6a inserted into the tubular catch members 7 respectively, as shown.

SUMMARY OF THE INVENTION

However, the above-mentioned assembling procedure should be made by moving or handling the instrument panel 6 awkwardly around the back side of the cowl panel 1. In other words, the operator has to work blindly to couple the instrument panel 6 with the cowl panel 1. Obviously, this is troublesome and difficult. Furthermore, since the instrument panel 6 is held by only the upper panel part 3, it is difficult to provide the instrument panel 6 with a satisfied supporting stability.

According, it is an object of the present invention to provide an instrument panel mounting structure through which an instrument panel is easily and precisely mounted to a given portion of a motor vehicle.

It is another object of the present invention to provide an instrument panel mounting structure through which the instrument panel is stably held in the vehicle body.

According to a first aspect of the present invention, there is provided a structure for mounting an instrument panel to a given portion in a vehicle, which comprises a cowl panel arranged at the given portion, the cowl panel including an upper panel part and a lower panel part which are united to constitute an inwardly protruding holder structure, the holder structure including a first section where the upper and lower panel parts intimately contact at mutually facing surfaces thereof and a second section where the upper and lower panel parts are spaced from each other, the second section constituting a rear end of the holder structure; and catch devices provided by the instrument panel and directed toward the holder structure, each catch device including a catch section and a guide section, the catch section being constructed to catch the rear end of the holder structure when brought to the rear end of the holder structure, the guide section being constructed to guide the catch section toward and to the rear end of the holder structure when shifted toward the holder structure.

According to a second aspect of the present invention, there is provided a structure for mounting an instrument panel to a given portion in a motor vehicle, which comprises a cowl panel arranged below a windshield of the vehicle, the cowl panel including an upper panel part and a lower panel part which are united to constitute an inwardly protruding holder structure, the holder structure including a first section where the upper and lower panel parts intimately contact at mutually facing surfaces thereof and a second section where the upper and lower panel parts are spaced from each other, the second section constituting a rear end of the holder structure; a catch section provided by the instrument panel, the catch section having an elongate recess sized to receive therein the rear end of the holder structure; a guide section provided by the instrument panel, the guide section being constructed to guide the catch section toward the rear end of the holder structure when shifted toward the rear end of the holder structure; a damper member provided on the rear end of the holder structure, so that when the rear end is inserted into the recess of the catch section, the damper member becomes in contact with an inner surface of the recess thereby to provide a frictional engagement therebetween; and a sloped surface that defines a bottom of the recess of the catch section, so that when the rear end of the holder structure is deeply inserted into the recess of the catch section, the frictional engagement between the damper member and the inner surface of the recess is enhanced.

BRIEF DESCRIPTION OF THE DRAWING

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Referring to FIGS. 1 to 6, there is shown an instrument panel mounting structure of the present invention, which is generally designated by numeral 100.

Figure 1:
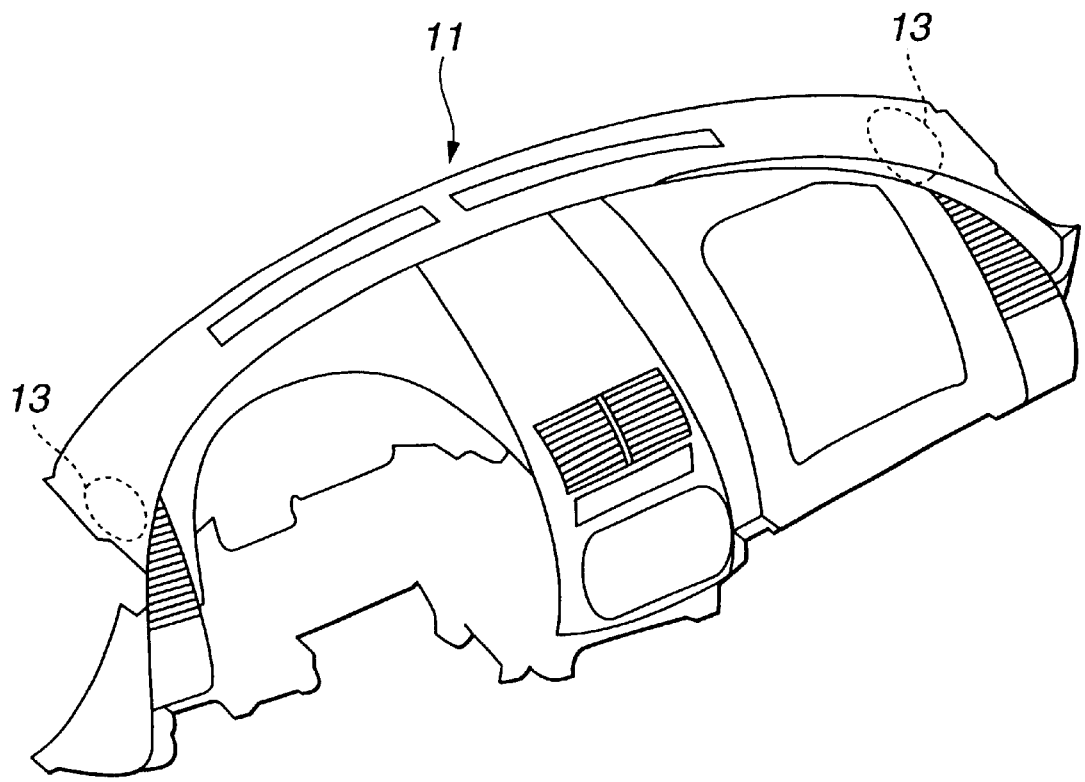
FIG. 1 is a perspective view of an instrument panel which is incorporated with an instrument panel mounting structure of the present invention.

Referring to FIG. 1, there is shown an instrument panel 11 which is to be mounted to a front part of a passenger room of an associated motor vehicle. As is seen from the drawing, the instrument panel 11 is equipped, at its lateral sides of lower surface thereof, with respective catch devices 13 which will be described in detail hereinafter.

Figure 2:
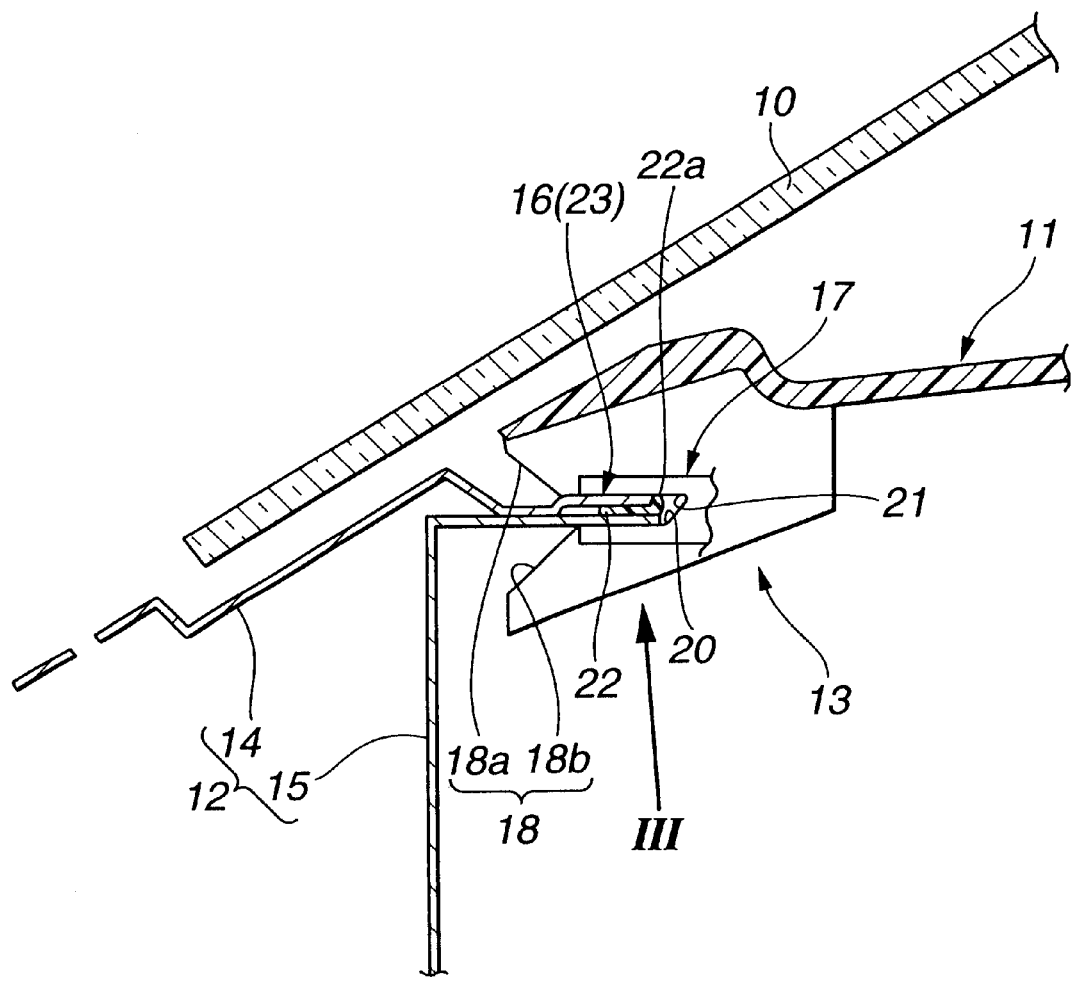
FIG. 2 is a sectional view of the instrument panel mounting structure of the present invention in an assembled condition.

As is best shown in FIG. 2, the instrument panel mounting structure 100 is arranged below a windshield 10. Denoted by numeral 12 is a cowl panel of metal, which comprises an upper panel part 14 and a lower panel part 15. As shown, a rear flat portion of the upper panel part 14 and an upper flat portion of the lower panel part 15 are mated to constitute a horizontal holder structure 16 with which the catch devices 13 are engaged.

Figure 5:
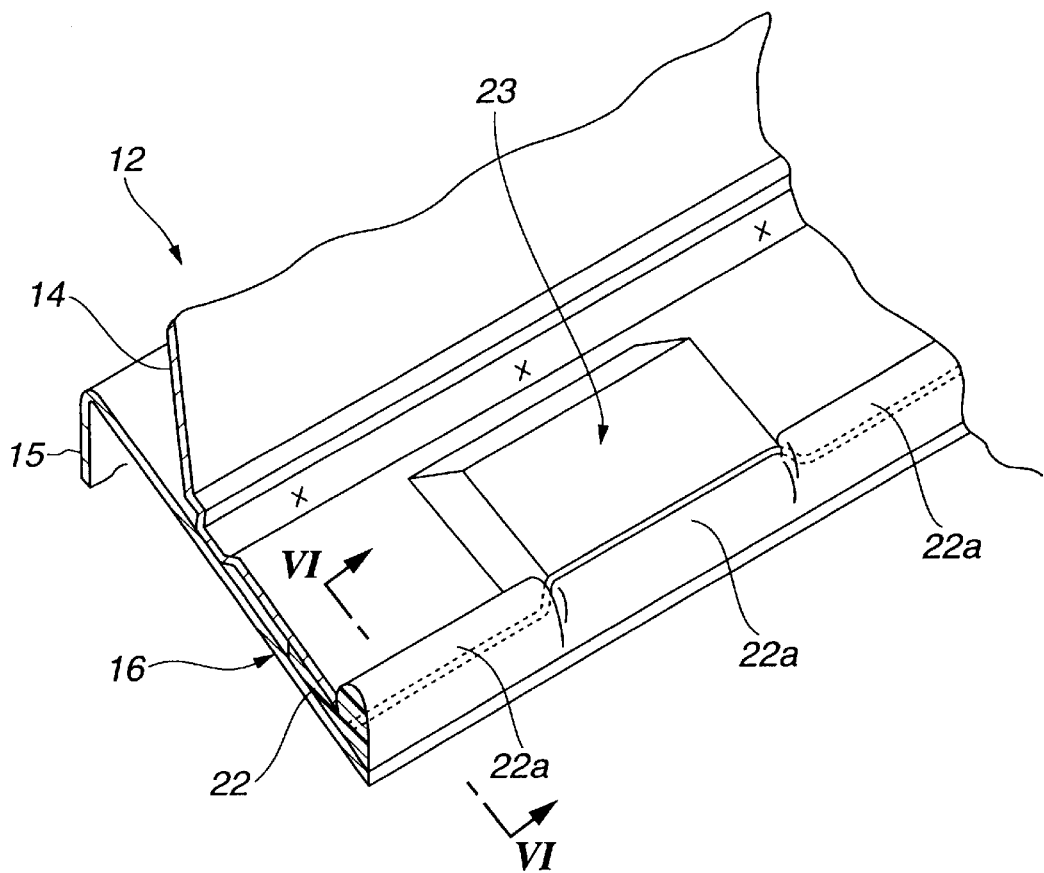
FIG. 5 is a perspective view of a horizontal holder structure defined by a cowl panel of a motor vehicle, with which the instrument panel mounting structure of the invention is incorporated.

As is seen from FIGS. 2 and 5, the rear flat portion of the upper panel part 14 and the upper flat portion of the lower panel part 15 are spot-welded along a given narrow zone, and the rear flat portion of the upper panel part 14 is formed with a rectangular raised portion 23.

That is, the holder structure 16 comprises a first section where like the spot-welded zone the two panel parts 14 and 15 intimately contact at mutually facing surfaces thereof and a second section where like the rear end of the holder structure 16, the two panel parts 14 and 15 are spaced from each other at the mutually facing surfaces thereof. It is to be noted that the second section of the holder structure 16 is caught by a catch section 17 which will be described in detail hereinafter.

Because of provision of the second section where the two panel parts 14 and 15 are spaced from each other and thus protected from the spot-welding, dimensional stability of the rear end of the holder structure 16 is Improved. Furthermore, due to provision of the first section where the two panel parts 14 and are welded to each other, the mechanical strength of the holder structure 16 is increased.

Figure 3:
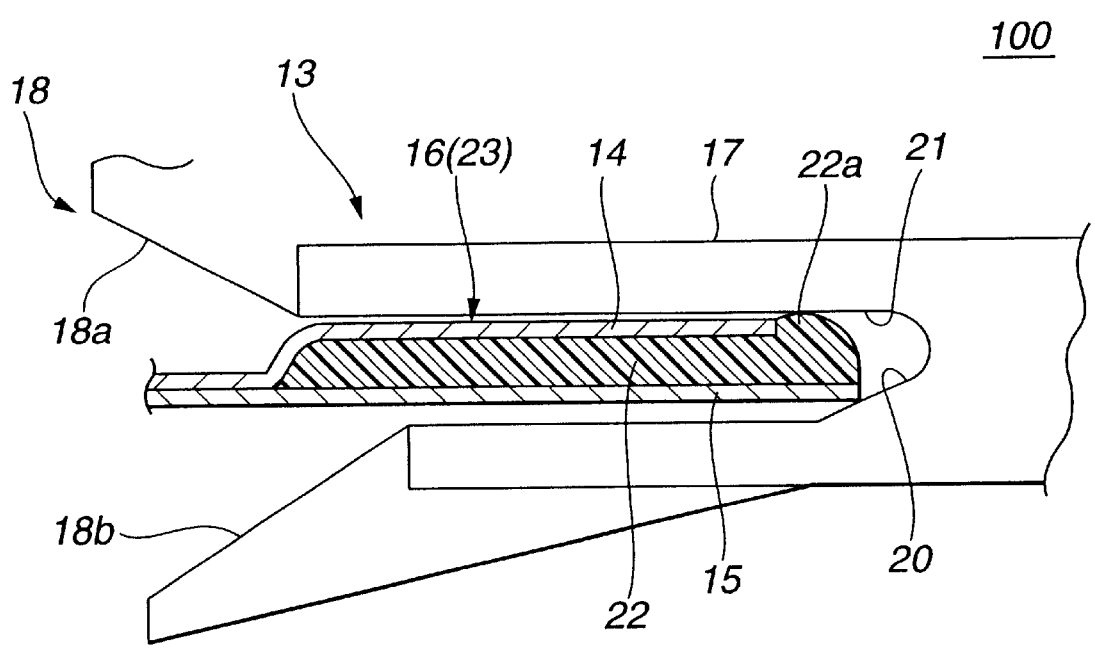
FIG. 3 is an enlarged view of the part indicated by the arrow "NIII" of FIG. 2.
Figure 6:
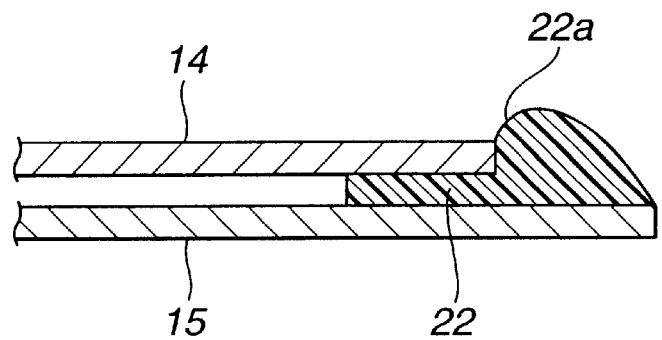
FIG. 6 is an enlarged sectional view taken along the line VI—VI of FIG. 5.

As is seen from FIGS. 3, 5 and 6, between the rear flat portion of the upper panel part 14 and the upper flat portion of the lower panel part 15, there is disposed a damper member 22 which has an exposed rounded part 22a formed on the rear end of the rear flat portion of the lower panel part 15, as shown in FIG. 6. It is to be noted that due to provision of the damper member 22 between the two panel parts 14 and 15, the resiliency of the holder structure 16 is increased. For placing the rounded part 22a of the damper member 22 on the rear end of the rear flat portion of the lower panel part 15, the rear flat portion of the upper panel part 14 is shaped shorter than the upper flat portion of the lower panel part 15, as shown in FIG. 6.

The damper member 22 used is a waterproof material of a type that has a suitable resiliency. Thus, when the damper member 22 is applied between the upper and lower panel parts 14 and 15, it exhibits a suitable waterproof function in addition to the damper function. It is to be noted that due to presence of such damper member 22, undesired low frequency noises, which would be produced when the catch devices 13 make a play relative to the holder structure 16, are suppressed or at least minimized.

Figure 4:
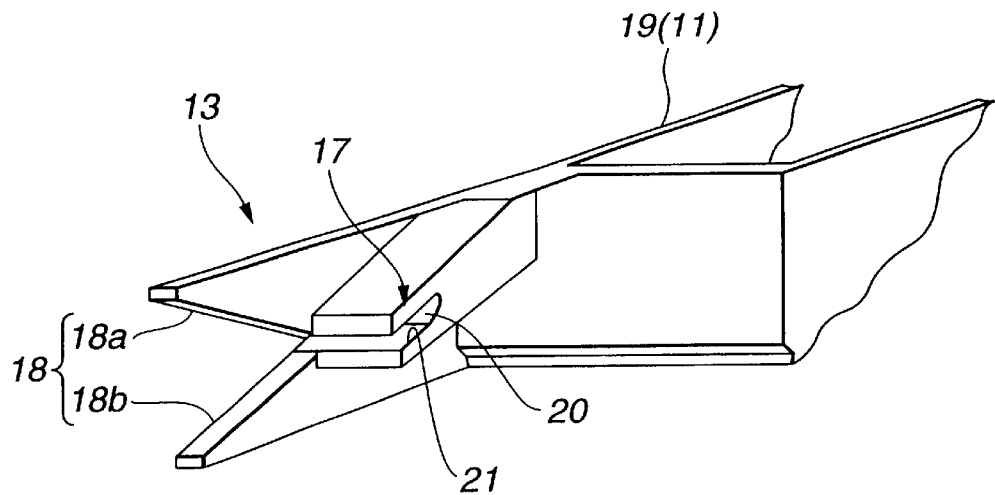
FIG. 4 is a perspective view of a catch device employed in the instrument panel mounting structure of the present invention.

As is seen from FIG. 4, each of the catch devices 13 generally comprises a catch section 17 and a guide section 18 which are positioned beside each other. Designated by numeral 19 is a box-like reinforcing structure defined by a lower surface of the instrument panel 11. With this reinforcing structure, the catch devices 13 are reinforced.

The catch section 17 comprises a recess 21 having a mouth portion directed forward. The mouth of the recess 21 is so sized as to receive the rear end of the holder structure 16 on which the rounded part 22a of the elastic material 22 is mounted, as will be understood from the drawing of FIG. 3.

As is seen from FIG. 3, the recess 21 of the catch section 17 has a sloped bottom 20, so that, when the rear end of the holder structure 16 is deeply and sufficiently inserted into the recess 21, the rounded part 22a of the damper member 22 is pressed against an upper inner surface of the recess 21, as is seen from the drawing.

Referring back to FIG. 4, the guide section 18 comprises a generally triangular recess (no numeral) that is defined by sloped upper and lower surfaces 18a and 18b which are angled to each other. The mouth portion of this recess is also directed forward. If desired, the sloped upper and lower surfaces 18a and 18b may be concavely or convexly curved.

As will be understood from FIGS. 3 and 4, the. mouth portion of the catch section 17 is positioned behind the mouth portion of the guide section 18. More specifically, as is seen from FIG. 3, when viewed from a lateral side of the catch device 13, an intersecting part of the sloped upper and lower surfaces 18a and 18b of the guide section 18 is positioned behind the mouth portion of the catch section 17.

For mounting the instrument panel 11 to the cowl panel 12, the following steps are employed in the invention.

First, as is seen from FIG. 2, due to work of a power assist carrier (not shown), the instrument panel 11 is conveyed behind the horizontal holder structure 16 of the cowl panel 12 the catch devices 13 facing forward, that is, toward the rear end of the holder structure 16 where the rectangular raised portion 23 is formed. Then, by the carrier, the instrument panel 11 is pushed forward by a certain distance. With this, the rear end of the holder structure 16 is brought into contact with the sloped upper and lower surfaces 18a and 18b of the guide section 18. Then, the instrument panel 11 is further pushed forward with a certain force. With this pushing, the rear end of the holder structure 16 is guided into the mouth portion of the catch section 17 of each catch device 13. As is seen from FIG. 3, further pushing of the instrument panel 11 toward the holder structure 16 causes insertion of the holder structure 16 into the recess 21 of the catch section 17. When, due to further pushing of the instrument panel 11, the rear end of the holder structure 16 reaches the sloped bottom 20 of the recess 21, the rounded part 22a of the damper member 22 is pressed against the upper surface of the recess 21 of the catch section 17, as is see from the drawing. Thus, upon completion of the insertion, the catch device 13 tightly catches the holder structure 16 of the cowl panel 12 at the portion where the rectangular raised portion 23 is formed.

As is seen from the foregoing description, according to the present invention, due to provision of the guide section 18, the work for assembling the instrument panel 11 onto the cowl panel 12 is easily and assuredly carried out. Thus, the rear ends of the holder structure 16 can be assuredly and stably held by the catch section 17. Furthermore, due to provision of rounded part 22a of the damper member 22 on the holder structure 16 and provision of the sloped bottom 20 by the catch section 17, deeper insertion of the rear end of the holder structure 16 into the recess 21 of the catch section 17 brings about a tight attachment of the instrument panel 11 to the cowl panel 12. Furthermore, due to the spot-welded construction and provision of the rectangular raised portion 23, the holder structure 16 of the cowl panel 12 has an increased mechanical strength and thus assuredly and stably holds the instrument panel 11.

Figure 7:
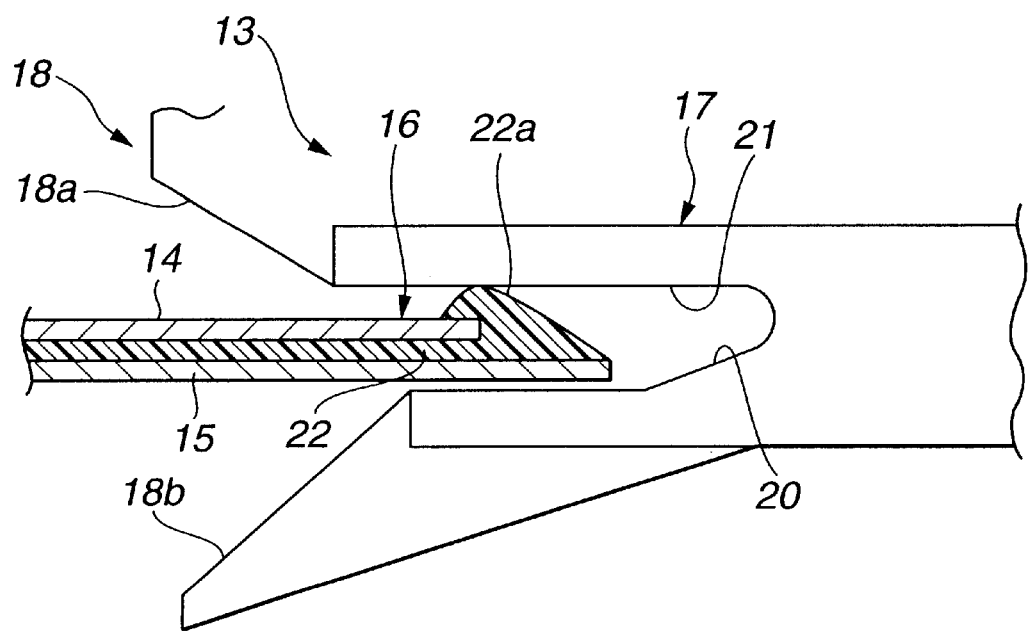
FIG. 7 is a sectional view of the instrument panel mounting structure which is a modification of the present invention, showing a condition wherein the catch device is going to catch the holder structure of the cowl panel.
Figure 8:
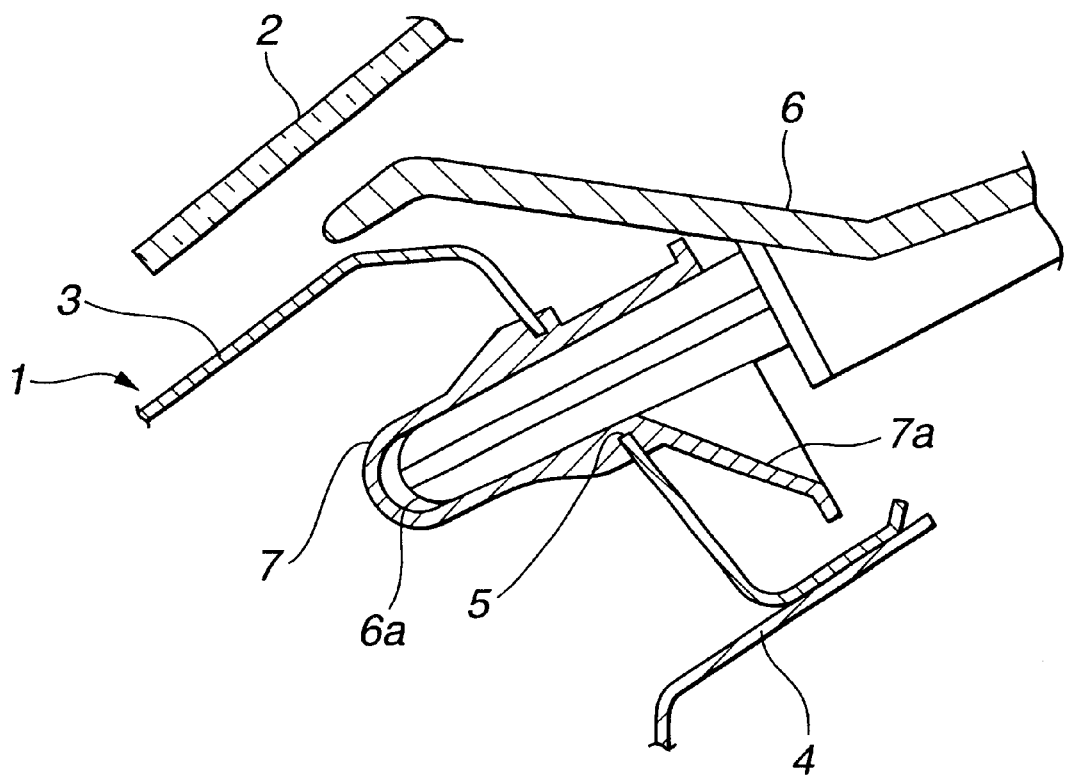
FIG. 8 is a view similar to FIG. 2, but showing a related art of the present invention.

Referring to FIG. 7, there is shown a modification of the present invention. In this modification, the holder structure 16 is not provided with the above-mentioned rectangular raised portion 23. However, for obtaining a dimensional stability of the rear ends of the holder structure 16, the damper member 22 is substantially entirely disposed between the rear flat portion of the upper panel part 14 and the upper flat portion of the lower panel part 15. Furthermore, the rounded part 22a of the damper member 22 is turned back onto the rear end of the rear flat portion of the upper panel part 14, as shown.

The entire contents of Japanese Patent Application 2000-200440 (filed Jul. 3, 2000) are incorporated herein by reference.

Although the invention has been described above with reference to the embodiment of the invention, the invention is not limited to such embodiment as described hereinabove. Various modifications and variations or such embodiment may be carried out by those skilled in the art, in light of the above descriptions.

What is claimed is:

1. A structure for mounting an instrument panel to a given portion in a vehicle, comprising:
    a cowl panel arranged at said given portion, said cowl panel including an upper panel part and a lower panel part which are united to constitute an inwardly protruding holder structure, said holder structure including a first section where said upper and lower panel parts intimately contact at mutually facing surfaces thereof and a second section where said upper and lower panel parts are spaced from each other at the mutually facing surfaces thereof, said second section constituting a rear end of said holder structure; and
    catch devices provided by said instrument panel and directed toward said holder structure, each catch device including a catch section and a guide section, said catch section being constructed to catch said rear end of said holder structure when brought to said rear end of said holder structure, said guide section being constructed to guide said catch section toward and to the rear end of said holder structure when shifted toward said holder structure.

2. A structure as claimed in claim 1, in which a damper member is resiliently deformably disposed between said upper and lower panel parts of said second section.

3. A structure as claimed in claim 2, in which said damper member has an exposed rounded part positioned at the rear end of said holder structure said exposed rounded part being pressed against said catch section to restrict a relative displacement therebetween when said holder structure is caught by said catch section.

4. A structure as claimed in claim 3, in which said damper member is a sealing material applied to said upper and lower panel parts to provide the cowl panel with a water proof function.

5. A structure as claimed in claim 1, in which said respective rear end portions of said upper and lower panel parts of the second section constitute a part of a rectangular raised structure defined by said holder structure.

6. A structure as claimed in claim 3, in which said catch section comprises a recess sized to resiliently receive said rear end of said holder structure, said recess having an inner surface to with which said exposed rounded part of said damper member is frictionally engageable.

7. A structure as claimed in claim 6, in which said recess of said catch section has a sloped bottom so that when said holder structure is deeply inserted into said recess, the frictional engagement between the inner surface of said recess and said exposed rounded part of said damper member is enhanced.

8. A structure as claimed in claim 1, in which said guide section comprises a generally triangular recess defined by mutually intersected sloped upper and lower surfaces, said sloped upper and lower surfaces being constructed to slidably contact the rear end of said holder structure for guiding said catch section toward said rear end of said holder structure.

9. A structure as claimed in claim 8, in which said guide section is positioned beside said catch section.

10. A structure as claimed in claim 1, in which said first section of said holder structure is provided by welding the upper and lower panel parts.

11. A structure as claimed in claim 1, further comprises a box-like reinforced structure defined by said instrument panel for increasing the mechanical connection between each of said catch devices and said instrument panel.

12. A structure for mounting an instrument panel to a given portion in a motor vehicle, comprising:
    a cowl panel arranged below a windshield of the vehicle, said cowl panel including an upper panel part and a lower panel part which are united to constitute an inwardly protruding holder structure, said holder structure including a first section where said upper and lower panel parts intimately contact at mutually facing surfaces thereof and a second section where said upper and lower panel parts are spaced from each other at the mutually facing surfaces thereof, said second section constituting a rear end of said holder structure;
    a catch section provided by said instrument panel, said catch section having an elongate recess sized to receive therein said rear end of said holder structure;
    a guide section provided by said instrument panel, said guide section being constructed to guide said catch section toward the rear end of said holder structure when shifted toward the rear end of said holder structure;
    a damper member provided on said rear end of said holder structure, so that when said rear end is inserted into the recess of said catch section, said damper member becomes in contact with an inner surface of said recess thereby to provide a frictional engagement therebetween; and
    a sloped surface that defines a bottom of the recess of said catch section, so that when said rear end of said holder structure is deeply inserted into said recess of said catch section, the frictional engagement between said friction member and the inner surface of said recess is enhanced.

* * * * *